United States Patent [19]

Okano

[11] Patent Number: 4,459,621
[45] Date of Patent: Jul. 10, 1984

[54] HIGH FREQUENCY CROSSTALK ELIMINATING CIRCUIT IN VIDEO DISC REPRODUCING DEVICE

[75] Inventor: Takashi Okano, Saitama, Japan

[73] Assignee: Universal Pioneer Corporation, Tokyo, Japan

[21] Appl. No.: 335,425

[22] Filed: Dec. 29, 1981

[30] Foreign Application Priority Data

Dec. 29, 1980 [JP] Japan .................................. 55-185315

[51] Int. Cl.³ .............................................. H04N 5/93
[52] U.S. Cl. ..................................... 358/340; 358/336
[58] Field of Search ............... 358/319, 327, 328, 340, 358/335, 336; 360/37.1, 33.1, 36.1, 36.2

[56] References Cited

U.S. PATENT DOCUMENTS

| 4,115,820 | 9/1978 | Morio et al. | 360/33.1 |
| 4,313,129 | 1/1982 | Fukui | 360/36.2 |
| 4,393,419 | 7/1983 | Arai et al. | 358/319 |

FOREIGN PATENT DOCUMENTS 2400298  9/1979  France ................................. 358/340

Primary Examiner—Donald E. McElheny, Jr.
Attorney, Agent, or Firm—Sughrue, Mion, Zinn, Macpeak and Seas

[57] ABSTRACT

A trap circuit is placed in a video signal reproduction path to remove frequency components in the range of the sync signal frequency to thereby eliminate crosstalk. The trap circuit is disabled during the blanking interval and preferably also during complicated portions of the information signal.

5 Claims, 11 Drawing Figures

HIGH FREQUENCY CROSSTALK ELIMINATING CIRCUIT IN VIDEO DISC REPRODUCING DEVICE

BACKGROUND OF THE INVENTION

This invention relates to a high frequency crosstalk eliminating circuit which eliminates high frequency crosstalk in a device which reproduces a record carrier such as, for instance, from a video disc in which a frequency-modulated video signal is recorded along tracks.

In a video disc in which a frequency-modulated video signal is recorded along tracks and the video signal is read while the video disc is turned at a constant linear velocity, there are no synchronizing signals recorded in a predetermined angular region subtended by the center of rotation. Therefore, when a video signal is recorded at a predetermined position on a track, there is sometimes a synchronizing signal recorded at a position, corresponding to the aforementioned predetermined position, of a track adjacent thereto, as shown in FIG. 1. In such a case, the recorded data being reproduced on a track 1 may be as indicated by the curve 3 in FIG. 1, while the recorded data on a track 2 adjacent thereto may be as indicated by the curve 4 in FIG. 1, with the synchronizing signals of the former being shifted relative to those of the latter. When a video disc according to this recording system is played back with an RF signal cross talk on the order of $-32$ to $-35$ dB, a part B of the signal on the reproducing track 1, which corresponds to the blanking period A of the adjacent track, will result in an irregular picture; that is, the synchronizing signal from the blanking period A will appear in the reproduced signal B in the form of a belt having a certain width in the picture as indicated at C or D in FIG. 2, thus causing a so-called "window wiper interference" wherein the belt is moved vertically or horizontally. Because of this interference, the picture appears unsatisfactory. In FIG. 2, reference character P designates a portion of the picture which changes complicatedly e.g. a portion which includes a complicated color pattern.

SUMMARY OF THE INVENTION

In view of the foregoing, an object of this invention is to provide a high frequency crosstalk eliminating circuit in a video disc reproducing device, in which the occurrence of the above-described irregularity in a reproduced picture is eliminated.

The foregoing object of the invention is achieved by trapping signal components in the vicinity of a frequency fsy corresponding to a synchronizing signal on the principle that the window wiper interference will only appear significantly in a part of a reproduced picture where the image content is not changed complicatedly, and also on the principle that the aforementioned frequency fsy is not included in an RF circuit.

This is achieved by operating a trapping signal to block the high frequency crosstalk component during times other than the blanking period when synchronizing signals should normally occur. The trap circuit may preferably also be disabled during complicated portions of the picture signal wherein the picture signal includes successive high frequency changes. In the preferred embodiment, the trap circuit may be placed before the FM detection circuit and is disabled by a gate circuit whenever a blanking interval occurs as detected by a synchronizing signal separator or whenever a high frequency component is detected in the information signal as detected by a high pass filter and window comparator.

BRIEF DESCRIPTION OF THE DRAWINGS

This invention will be described with reference to the accompanying drawings, in which.

DETAILED DESCRIPTION OF THE INVENTION

Figure 1:
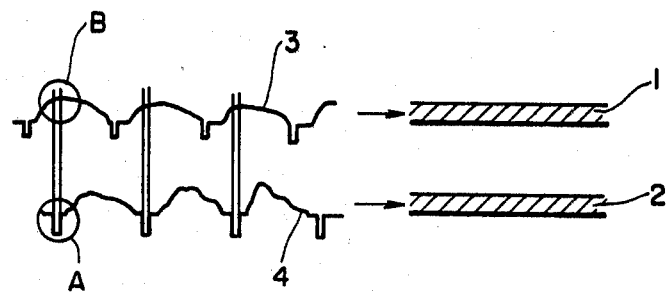
FIG. 1 and FIG. 2 are respectively a waveform diagram and an image diagram for a description of the crosstalk of synchronizing signals on adjacent tracks.
Figure 2:
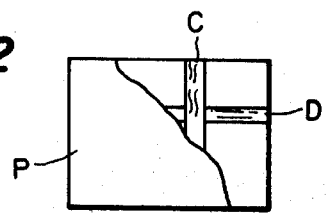
Figure 3:
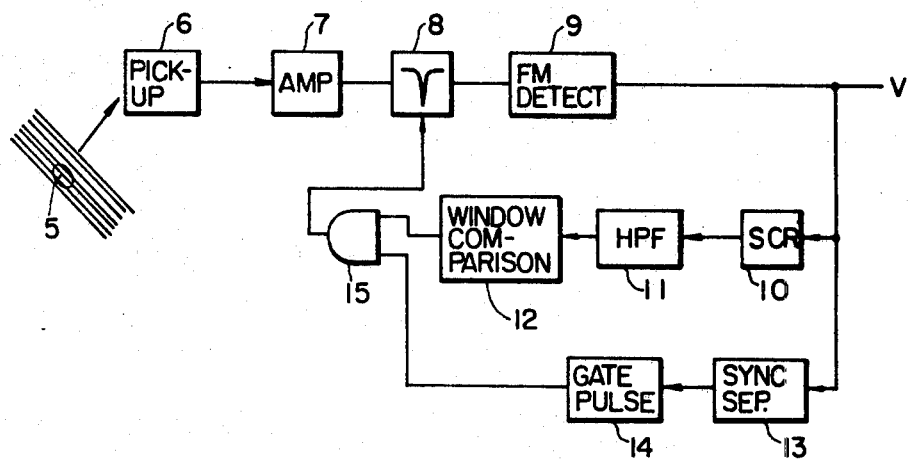
FIG. 3 is a block diagram showing one embodiment of this invention.

FIG. 3 is a block diagram showing one embodiment of the invention. In FIG. 3, reference numeral 5 designates tracks on a video disc. Data recorded on the tracks are optically read by a pickup 6 and converted into electrical signals by a photo-electric conversion means as is well known. The output signal of the pickup 6 is applied to an amplifier 7, the output of which is inputted to a trap circuit 8 which is selectively inserted by a trap control signal. The output signal of the trap circuit 8 is applied to an FM detector 9, the output of which is delivered as a video output.

On the other hand, the output signal of the FM detector 9 is supplied to an information signal removing circuit (SRC) 10 and a synchronizing separator circuit 13. An information signal is removed from the output signal of the FM detector 9 by the information signal removing circuit 10, and a synchronizing signal is extracted from the output signal by the synchronizing separator circuit 13. The synchronizing separator circuit 13 is able to discriminate between synchronizing signals on adjacent tracks and synchronizing signals during the blanking intervals of the aimed or reproducing track. Because the level of the crosstalk synchronizing is very small compared with the level of the synchronizing signal during the blanking intervals of the aimed track, only the latter is detected and separated by the synchronizing separator circuit 13. The output signal of the information signal removing circuit 10 is applied to a high-pass filter 11, the output signal of which is supplied to a window comparator 12. The synchronizing signal provided by the synchronizing separator circuit 13 is applied to a gate pulse generating circuit 14. The output of the window comparator 12 and the output of the gate pulse generating circuit 14 are applied to an AND gate 15, the output of which is applied, as the trap control signal, to the trap circuit 8.

Figure 4:
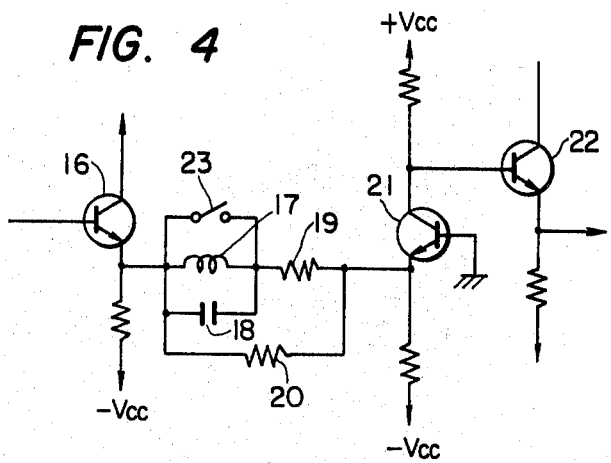
FIG. 4 is a circuit diagram of a trap circuit in the embodiment in FIG. 3.

The trap circut 8, as shown in FIG. 4, comprises: a transistor 16 serving as a buffer circuit; a parallel resonance circuit consisting of a coil 17 and a capacitor 18; resistors 19 and 20; a base-grounded transistor 21; and a transistor 22 forming a buffer circuit. The resonance frequency of the parallel resonance circuit is selected to be $$1/(2\pi\sqrt{LC}) \approx fsy$$

where L is the inductance of the coil 17, and C is the capacitance of the capacitor 18.

A relay contact means 23 is connected in parallel to the resonance circuit. The relay contact means 23 is turned on and off by the output of the AND gate 15.

Figure 5A:
FIGS. 5(a) through 5(g) are waveform diagrams for a description of the operation of the embodiment of the invention shown in FIG. 3.
Figure 5B:
Figure 5C:

In the circuit thus organized, the waveform of the output video signal of the FM detector 9 is as shown in FIG. 5(a). A synchronizing signal is separated from the video signal shown in FIG. 5(a) by the synchronizing separator circuit 13. The waveform of the output signal of the synchronizing separator circuit 13 is as shown in FIG. 5(b). Being triggered with the synchronizing signal, the gate pulse generating circuit 14 produces a gate pulse having a predetermined pulse width as shown in FIG. 5(c).

Figure 5D:
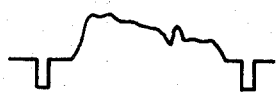
Figure 5E:
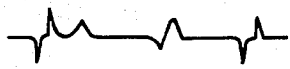

On the other hand, the information signal removing circuit 10 removes an information signal from the output signal of the FM detector 9, and outputs a luminance signal component. The output signal waveform of the information signal removing circuit 10 is as shown in FIG. 5(d). The information signal component from the information signal removing circuit 10 is then applied to the high-pass filter 11 having a cutoff frequency on the order of 100 to 500 KHz, so that a high frequency component is extracted from the luminance signal component. The output signal waveform of the high-pass filter 11 shown in FIG. 5(e). The high frequency component thus extracted is substantially zero in an image portion where the image content is scarcely changed.

Figure 5F:
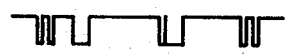
Figure 5G:
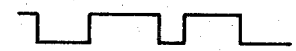

The window comparator 12 detects when the output of the high-pass filter 11 becomes substantially zero, and provides an output signal. The output signal of the window comparator 12 is as shown in FIG. 5(f). The output of the AND gate 15 is the logical product of the output of the window comparator 12 and the output of the gate pulse generating circuit 14. The output of the AND gate 15 is as shown in FIG. 5(g). During the period that the output of the AND gate 15 is at a low logical level, the switch 23 is maintained closed (on) to shortcircuit the parallel resonance circuit, and therefore no trap operation is effected. The period that the output of the AND gate 15 is at the low logical level corresponds to the period that the gate pulse generating circuit 14, being triggered by the synchronizing signal of the video signal, provides an output signal, i.e., the blanking period of the video signal, or a part of the video signal the content of which is changed complicatedly, as is apparent from FIG. 5. In this case, the trap circuit does not trap the synchronizing signal.

During the period that the output of the AND gate 15 is at a high logical level, the switch 23 is maintained open (off), and therefore the parallel resonance circuit is in operation and the trap circuit 8 carries out the trap operation. The output of the AND gate 15 is raised to the high logical level either when the gate pulse generating circuit provides no output, or when the content of the video signal is not changed complicatedly, i.e. when it does not include a prolonged period of high frequency changes. If, during this period, crosstalk of the synchronizing signal of the adjacent track exists in the video signal, the crosstalk is trapped by the trap circuit 8, and therefore it is not inputted to the FM detector 9.

As is apparent from the above description, the crosstalk of the synchronizing signal of the adjacent track is eliminated according to the invention, and therefore no window wiper interference is caused.

If the band width of the trap circuit 8 is excessively small, then transient residual components appear in the picture at both sides of the band width. Therefore, the trap circuit 8 should have a suitable band width.

The above-described embodiment of the invention is so designed that a high frequency component is detected from a luminance signal so that the trap circuit is operated only when an image content is being scarcely changed. However, if the amount of compensation by the trap circuit is inadequate, the embodiment may be modified so that the trap circuit operates over the entire reproducing video signal, e.g. everywhere other than the blanking period. In this case also, the same effect can be obtained.

The technical concept of the invention may be applied to any of the capacity type, optical type or magnetic type recording systems wherein a record pattern is such that the synchronizing signals on adjacent tracks are aligned as images on the screen.

What is claimed is:

1. In a video disc reproducing device for reproducing from a video disc a video signal having information signals separated by blanking intervals containing synchronizing signals, a high frequency crosstalk eliminating circuit, comprising:
    a trap circuit for substantially eliminating from said video signal frequency components substantially corresponding to the frequency of said synchronizing signals only during said information signals.

2. A high frequency crosstalk eliminating circuit as claimed in claim 1, wherein said trap circuit substantially eliminates said frequency components when enabled and does not remove said frequency components when disabled, said crosstalk eliminating circuit further comprising means for disabling said trap circuit during said blanking intervals.

3. A high frequency crosstalk eliminating circuit as claimed in claim 2, further comprising means for detecting a synchronizing signal in said video signal and control means for disabling said trap circuit in response to said detected synchronizing signal.

4. A high frequency crosstalk eliminating circuit as claimed in claim 3, further comprising means for detecting a frequency component above a predetermined level in said video signal, said control means also disabling said trap signal in response to said detected frequency component above a predetermined level.

5. A high frequency crosstalk eliminating circuit as claimed in claim 4, wherein said means for detecting a synchronizing signal comprises a sync signal separator for separating a synchronizing signal from said video disc signals and a pulse generator for generating a pulse of predetermined duration in response to each separated synchronizing signal; wherein said means for detecting said frequency component above a predetermined level comprises means for separating said information signal from said video disc signals, a high pass filter receiving said separated information signal, and a last means responsive to an output of said high pass filter for providing an output signal when said high pass filter output is within a predetermined range; and wherein said control means receives said outputs from said pulse generator and last responsive means and disables said trap circuit whenever either said pulse is received from said pulse generator or an output signal is not received from said last responsive means.

* * * * *